(12) United States Patent
Al-Saeed et al.

(10) Patent No.: US 11,698,335 B1
(45) Date of Patent: Jul. 11, 2023

(54) STORAGE TANK APPARATUS FOR ONLINE INSPECTION

(71) Applicant: SAUDI ARABIAN OIL COMPANY, Dhahran (SA)

(72) Inventors: Mohammed S. Al-Saeed, Dammam (SA); Mohamed Attia, Dhahran (SA); Rami A. Al-Sulaim, Khobar (SA); Yousef A. Alhannoush, Al-Khobar (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/652,862

(22) Filed: Feb. 28, 2022

(51) Int. Cl.
*G01N 17/04* (2006.01)
*B65D 25/54* (2006.01)
(Continued)

(52) U.S. Cl.
CPC ............. *G01N 17/04* (2013.01); *B65D 25/54* (2013.01); *B65D 90/12* (2013.01); *B65D 90/48* (2013.01);
(Continued)

(58) Field of Classification Search
CPC ...... G01N 17/04; G01N 17/006; G01N 17/02; B65D 25/54; B65D 90/12; B65D 90/48;
(Continued)

(56) References Cited

U.S. PATENT DOCUMENTS

| 5,451,135 A | 9/1995 | Schempf et al. |
| 6,843,135 B2 | 1/2005 | Douglas et al. |

(Continued)

FOREIGN PATENT DOCUMENTS

| CN | 106323385 A | 1/2017 |
| CN | 105158337 B | 3/2018 |

(Continued)

OTHER PUBLICATIONS

American Petroleum Institute, "Welded Tanks for Oil Storage"; API Standard 650, Twelfth Edition, Addendum 1; Sep. 2014 (519 pages).
(Continued)

*Primary Examiner* — Ryan D Walsh
(74) *Attorney, Agent, or Firm* — Osha Bergman Watanabe & Burton LLP

(57) ABSTRACT

A storage tank apparatus and a method for determining a bottom plate health for the apparatus is disclosed. A storage tank apparatus includes a tank foundation having a bottom plate support surface and at least one foundation tube housed inside at least one foundation channel, a bottom plate, a tank shell, at least one shell tube, at least one foundation inspection window, at least one shell inspection window and testing equipment that is operatively connected to the foundation tube and shell tube. A method for determining a bottom plate health for a storage tank apparatus includes operatively connecting the testing equipment to the foundation tube and shell tube, measuring a first and a second level of corrosion respectively, accessing the testing equipment by a computer processor, storing the first and second level of corrosion and determining the bottom plate health while the storage tank apparatus is in service.

20 Claims, 5 Drawing Sheets

(51) Int. Cl.
  *G01N 17/00* (2006.01)
  *B65D 90/48* (2006.01)
  *E04H 7/02* (2006.01)
  *B65D 90/12* (2006.01)
  *F17C 13/08* (2006.01)
  *G01N 17/02* (2006.01)

(52) U.S. Cl.
  CPC ............. *E04H 7/02* (2013.01); *F17C 13/081* (2013.01); *G01N 17/006* (2013.01); *G01N 17/02* (2013.01); *F17C 2205/0103* (2013.01); *F17C 2205/0153* (2013.01)

(58) Field of Classification Search
  CPC .. E04H 7/02; F17C 13/081; F17C 2205/0103; F17C 2205/0153
  See application file for complete search history.

(56) References Cited

U.S. PATENT DOCUMENTS

| | | | |
|---|---|---|---|
| 7,367,236 | B2 | 5/2008 | Georgeson et al. |
| 2004/0244491 | A1 | 12/2004 | Vyas et al. |
| 2013/0139453 | A1* | 6/2013 | Jolly ..................... E02D 27/425 52/173.1 |
| 2016/0272291 | A1 | 9/2016 | Outa, et al. |
| 2021/0025808 | A1* | 1/2021 | Al-Abbas ............ G01N 33/383 |
| 2021/0276641 | A1 | 9/2021 | Beard, III et al. |

FOREIGN PATENT DOCUMENTS

| | | | |
|---|---|---|---|
| CN | 108680644 | A | 10/2018 |
| CN | 113051325 | A * | 6/2021 |
| EP | 1 209 444 | B1 | 12/2010 |
| JP | 2019-12054 | A | 1/2019 |

OTHER PUBLICATIONS

American Petroleum Institute, "Tank Inspection, Repair, Alteration, and Reconstruction"; API Standard 653, Fifth Edition; Nov. 2014 (173 pages).

* cited by examiner

STORAGE TANK APPARATUS FOR ONLINE INSPECTION

BACKGROUND

Storage tanks are used to store oil, gas, chemical liquids, or raw materials employed for industrial uses. Storage tanks typically sit on top of a tank foundation and include a tank shell connected to an outer perimeter of a bottom plate and a roof. The bottom plate contacts the tank foundation and provides a bottom structural support for a storage material being stored within the tank shell. Corrosion on a bottom plate of a storage tank may lead to metal loss and ultimately perforations in the bottom plate. Storage tank leaks pose a serious problem and may lead to unplanned shutdowns, loss of product and the materials being stored are often harmful to humans and the environment.

Tank inspections are performed regularly by tank operators to ensure the integrity of tanks by preventing accidental leaks and avoiding costly unplanned shutdowns. Bottom plate corrosion is one of the most common reasons for storage tank failure and tank inspections include measuring a level of corrosion for a bottom plate. Storage tanks typically need to be drained, cleaned, and degassed to provide access to the bottom plate for a manual inspection to determine a level of corrosion using testing equipment. The level of corrosion measured on the bottom plate will aid in decisions regarding the remaining lifespan of the storage tank and helps to prevent future unplanned shutdowns by identifying potential issues.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments disclosed herein relate to a storage tank apparatus. The storage tank apparatus includes a tank foundation having a bottom plate support surface and at least one foundation tube housed inside at least one foundation channel having access provided by at least one foundation inspection window, a bottom plate having a product side and a soil side, a tank shell connected to an outer perimeter of the bottom plate and at least one shell tube connected to the product side of the bottom plate having access provided by a shell inspection window. The apparatus further includes testing equipment that is operatively connected to the at least one foundation tube and the at least one shell tube. The testing equipment may measure a first level of corrosion on the product side of the bottom plate and a second level of corrosion on the soil side of the bottom plate to determine a bottom plate health when the storage tank apparatus is in service.

In general, in one aspect, embodiments disclosed herein relate to a method for determining the bottom plate health of a storage tank apparatus. The method includes operatively connecting testing equipment to both of at least one foundation tube and at least one shell tube, measuring using the testing equipment operatively connected to the foundation tube a first level of corrosion on a product side of a bottom plate and measuring using the testing equipment operatively connected to the shell tube, a second level of corrosion on a soil side of the bottom plate. The method further includes accessing the testing equipment by a computer processor through the foundation inspection window and the shell inspection window, storing the first and second level of corrosion using the computer processor and determining the bottom plate health based on monitoring the first and second level of corrosion while the storage tank apparatus is in service.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

Figure 1A:
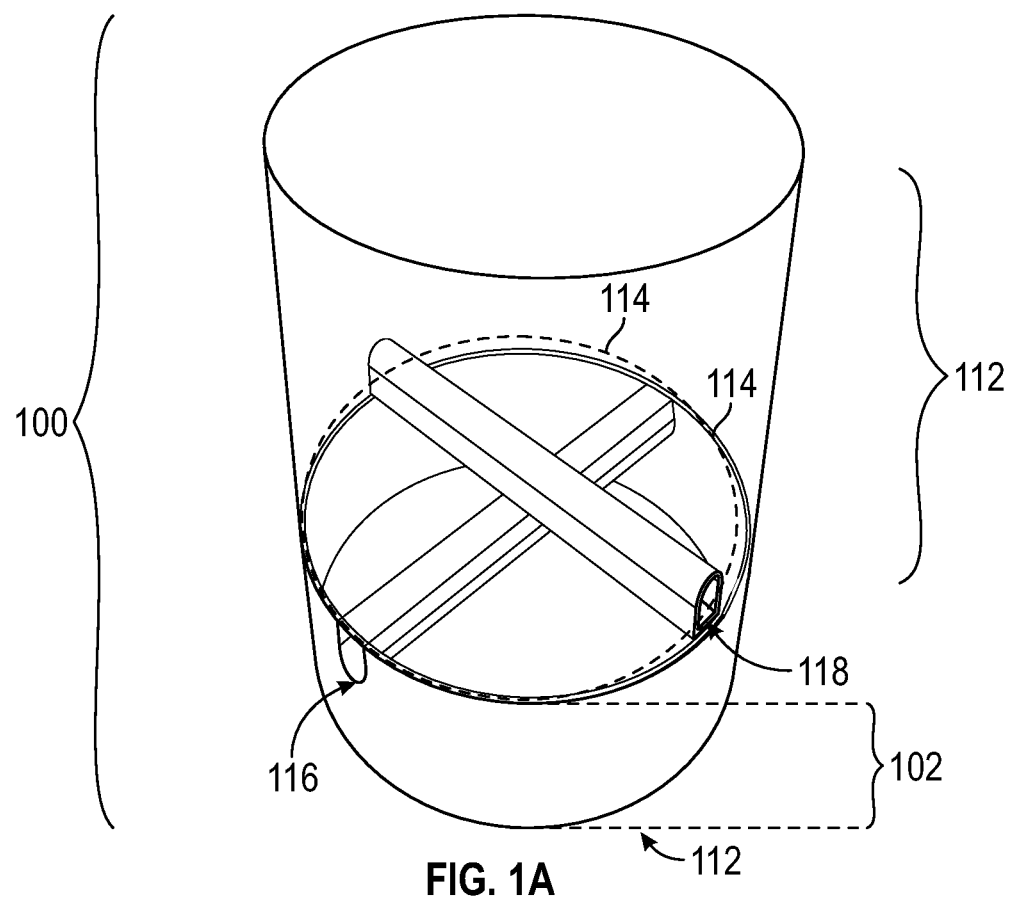
FIGS. 1A-1B show an apparatus in accordance with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Embodiments disclosed herein describe a storage tank apparatus and a method capable of determining a bottom plate health for the storage tank apparatus. The bottom plate on a storage tank apparatus is susceptible for corrosion over the service life of the storage tank apparatus. One of the primary reasons of product loss, or a storage tank leak, is due to corrosion to the bottom plate. For this reason, when tanks are inspected, corrosion measurements are made on the bottom plate. Corrosion measurements are desired on both the soil side and the product side of the bottom plate. The level of corrosion measured will aid in decisions regarding remaining lifespan and helps to prevent future unplanned shutdowns by identifying potential issues. Storage tanks typically need to be drained, cleaned, and degassed to provide access to the bottom plate for a manual inspection to determine a level of corrosion, and the process puts a storage tank out of service during the manual inspection.

One or more embodiments disclosed herein describe a storage tank apparatus capable of determining a bottom plate health while the storage tank apparatus is in service with inspection window access provided by at least one foundation inspection window and at least one shell inspection window. A foundation tube operatively connected to testing equipment accessed through the foundation inspection window is able to determine a first level of corrosion on a product side of a bottom plate and a shell tube operatively connected to testing equipment accessed through the shell inspection window is able to determine a second level of corrosion on a soil side of the bottom plate. The measurements used to determine a first and second level of corrosion are used to determine a bottom plate health, while the storage tank apparatus is in service. The ability to determine a bottom plate health while the storage tank apparatus is in service reduces non-productive time by not needing to drain, clean, and degas the storage tank apparatus to provide access to the bottom plate. The bottom plate health will aid in decisions regarding remaining lifespan and helps to prevent future unplanned shutdowns by identifying potential issues in real-time.

Figure 1B:
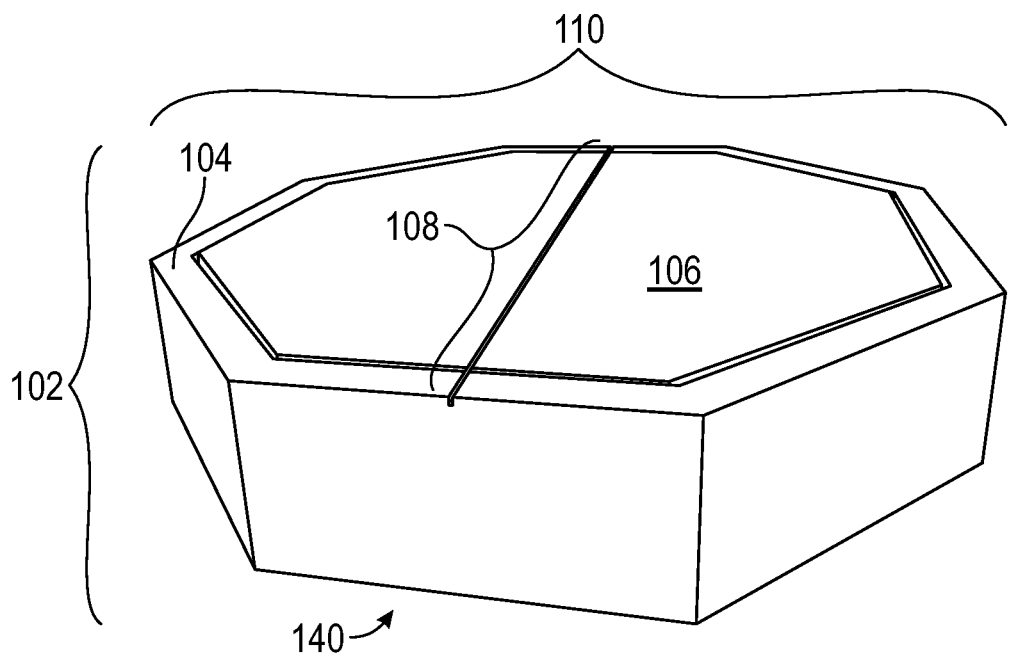

FIGS. 1A and 1B show a storage tank apparatus (100) in accordance with one or more embodiments. A tank shell (112) is a shown connected to an outer perimeter of a bottom plate (114). A tank shell (112) is the largest component of the storage tank apparatus (100), and in combination with the bottom plate (114), is a storage vessel for a storage material. The storage material may be oil, gas, chemical liquids, or raw materials employed for industrial uses. The bottom plate (114) provides a bottom structural support for the storage material stored within the tank shell (112). The bottom plate (114) is susceptible to corrosion, throughout a storage tanks service life. Corrosion on a bottom plate (114) may lead to metal loss and ultimately perforations and product loss. The bottom plate (114) has a product side, that contacts a storage material and a soil side, that contacts the bottom plate support surface (110) of the tank foundation (102). The storage tank apparatus (100) also has at least one shell tube that is connected to the product side of the bottom plate (114). The shell tube, discussed further in FIG. 2B, is a semi-circular opening that is attached to the product side of the bottom plate (114) and accessed by at least one shell inspection window (118) that is disposed in the tank shell (112). The shell inspection window (118) is a 2 in (inches) to 3 in opening disposed in the side of the tank shell (112) and located as low as possible on the tank shell (112) without compromising the weld between the tank shell (112) and the bottom plate (114). The shell inspection window (118) that provides access to the shell tube will be illustrated further in FIG. 2B.

A tank foundation (102) is shown in FIG. 1A, and in greater detail in FIG. 1B. A tank foundation (102) is a base structure designed to support the weight of an overlying portion of the storage tank apparatus (100). The tank foundation (102) includes a bottom plate support surface (110) and at least one foundation channel (108). The bottom plate support surface (110) is the top surface of the tank foundation (102) and contacts the soil side of bottom plate, shown in FIG. 2A-2B. A reinforced concrete perimeter (104) and the compacted fill portion (106) make up a bottom plate support surface (110). The reinforced concrete perimeter (104), sitting on the surface of the Earth (140) is the strongest structural element of the tank foundation (102) and is designed to fit the shape of an overlying bottom plate (114) as well as provide structural support. A compacted fill portion (106) enclosed by the reinforced concrete perimeter (104) may be gravel, compacted sand, soil, earth materials or any combination thereof. The compacted fill portion (106) provides structure support for an overlying bottom plate (114) as well as contain any possible storage tank leak. The storage tank apparatus (100) may also include any type of roof, including a floating roof rank, fixed roof tank, or open top tanks. The type of roof used in the storage tank apparatus (100) does not deviate from the functionality of the apparatus.

The tank foundation (102) has at least one foundation channel (108) that extends across the diameter of the bottom plate support surface (110). The foundation channel (108) is a semi-circular opening that is a housing for a foundation tube, which has access provided by a foundation inspection window (116). The foundation inspection window (116) is a 2" (in) to 3" (in) opening disposed in the side of the reinforced concrete perimeter (104). The foundation inspection window (116) provides access to the foundation tube. The foundation tube and foundation inspection window (116) will be illustrated further in FIG. 2B.

Figure 2A:
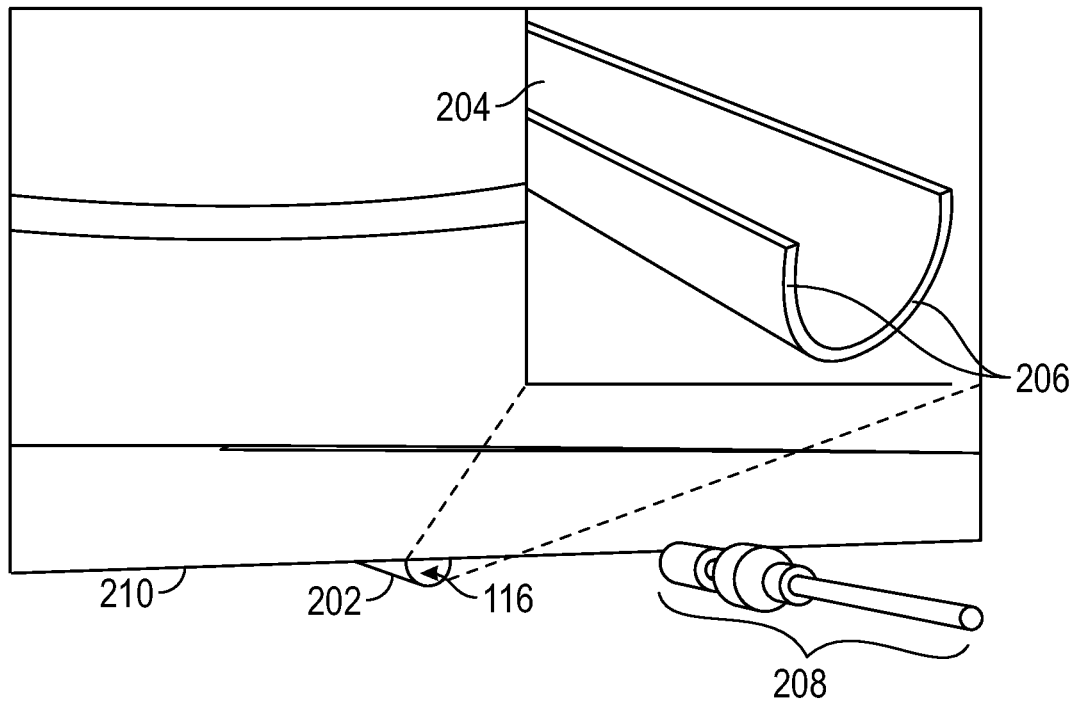
FIGS. 2A-2D show an apparatus in accordance with one or more embodiments.
Figure 2B:
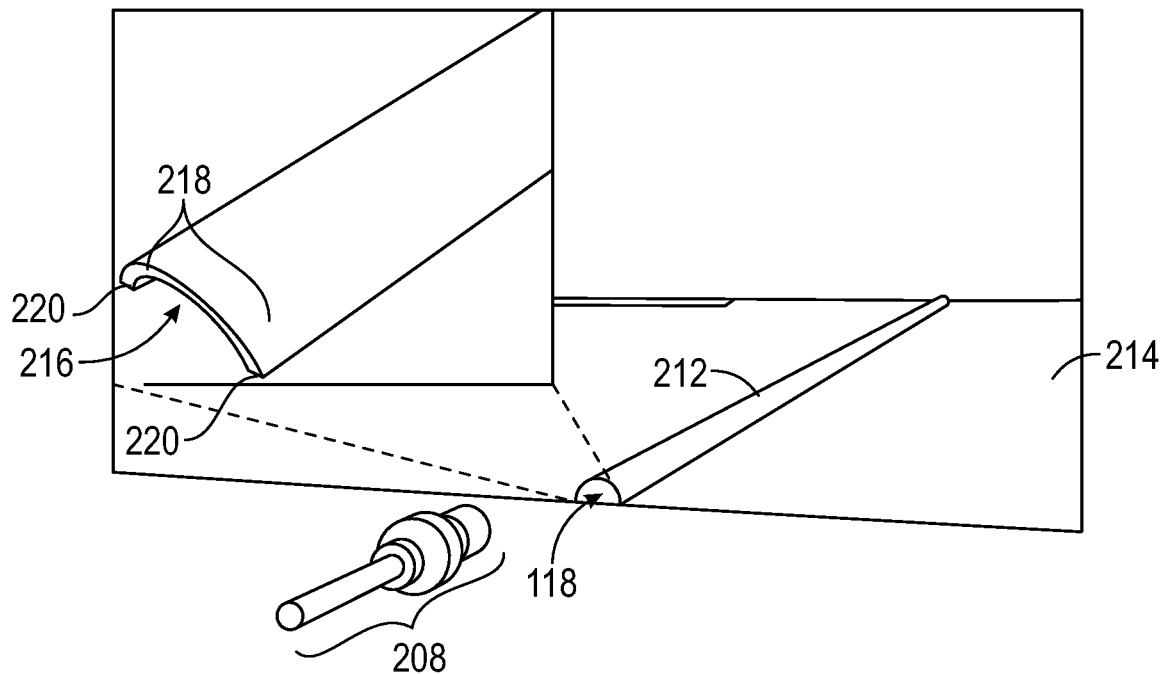
Figure 2C:
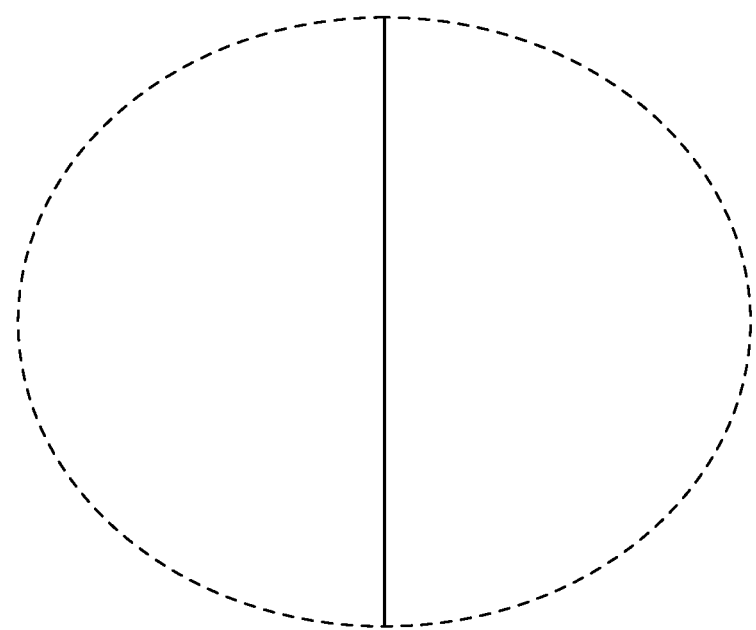
Figure 2D:
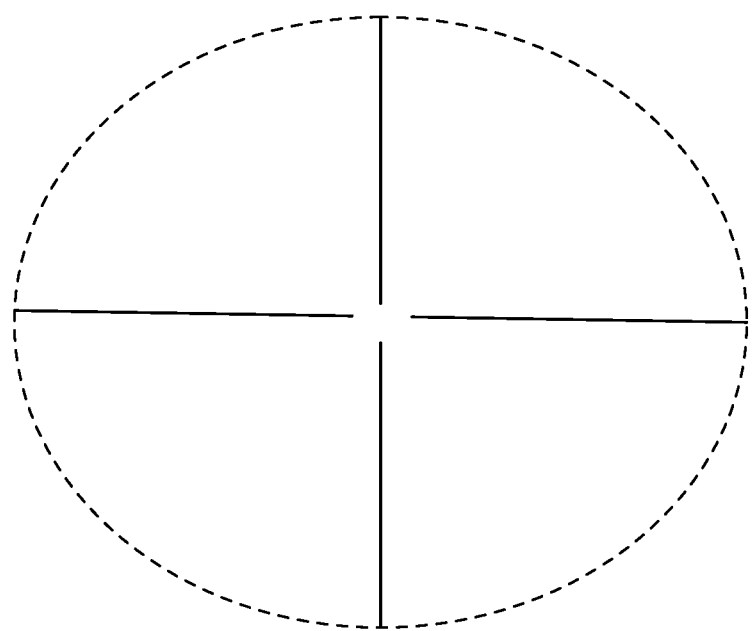

FIGS. 2A and 2B show a storage tank apparatus and testing equipment operatively connected to a storage tank apparatus. In FIG. 2A, a foundation tube (202) is seen, having a first open side (204) facing the soil side (210) of the bottom plate and a first semi-circular side (206) inserted into the foundation channel. A storage tank apparatus will have at least one foundation tube (202) that is housed inside at least one foundation channel. The foundation tube (202) has a first semi-circular side (206) that fits against the semi-circular opening in the foundation channel.

FIG. 2A also shows a foundation inspection window (116), or an opening disposed in the side of the reinforced concrete perimeter portion of the tank foundation and provides access to the foundation tube (202). Testing equipment (208) is shown operatively connected to the foundation tube (202). Testing equipment (208), in accordance with one or more embodiments, may include a thickness measurement probe, an online ultrasonic sensor, a magnetic flux leakage probe, or any other device or probe measuring corrosion that fits inside the foundation tube (202).

The testing equipment (208) measures a first and second level of corrosion and the testing equipment's functionality will be discussed in more detail in FIG. 3. The testing equipment (208) is operatively connected to the foundation tube (202) which includes testing equipment (208) being permanently disposed of inside of the foundation tube (202) and/or being inserted inside of the foundation tube (202) periodically, when obtaining corrosion measurements is desirable. If the testing equipment (208) is permanently disposed inside of the foundation tube (202), measurements of a first level of corrosion may be made on the product side (214) of the bottom plate at any time. If the testing equipment is not permanently disposed inside of the foundation tube (202), it must be inserted into the foundation tube (202) through the foundation window (116) that provides access to the foundation tube (202). In this case, the testing equipment (208) is able to measure a first level of corrosion on a product side (214) of a bottom plate only while inserted.

In FIG. 2B, a shell tube (212) is seen, having a second open side (216) facing the product side (214) of the bottom plate, a second semi-circular side (218) that contacts the storage material and a shell endpoint surface (220) that is attached to the product side (214) of the bottom plate. Some storage tanks may contain floating roof legs attached to the product side (214) of the bottom plate designed to hold a storage tank roof, when the tank is emptied. In these cases, a shell tube (212) must not intersect a floating roof leg that is disposed on the product side (214) of the bottom plate. The shell tube (212) and the foundation tube (202) may be composed of any suitable metallic material as long as it is the same material as the bottom plate, so as to avoid dissimilar metal corrosion. The foundation tube (202) may be composed of a non-metallic material as well.

FIG. 2B shows a shell inspection window (118) comprising at least one shell opening disposed in the side of the tank shell that provides access to the shell tube (212). The shell inspection window (118) is a 2 in to 3 in opening disposed in the side of the tank shell (112) and located as low as possible on the tank shell (112) without compromising the weld between the tank shell (112) and the bottom plate (114). Both the shell inspection window (118) and the foundation inspection window (116) may include plugs to close the openings, whenever testing equipment is not operatively connected to the tubes. The external plugs may be used to prevent water ingress and to avoid corrosion issues.

Testing equipment (208) is operatively connected to the shell tube (212) which includes being permanently disposed of inside of the shell tube (212) and/or being inserted inside of the shell tube (212) periodically, when obtaining corrosion measurements is desirable. Testing equipment (208), in accordance with one or more embodiments, may include a thickness measurement probe, an online ultrasonic sensor, a magnetic flux leakage probe, or any other device or probe measuring corrosion that fits inside the shell tube (212). If the testing equipment (208) is permanently disposed inside of the shell tube (212), measurements of a second level of corrosion may be made on the soil side (210) of the bottom plate at any time. If the testing equipment (208) is not permanently disposed inside of the shell tube (212), it must be inserted into the shell tube (212) through the shell window (118) that provides access to the shell tube (212). In this case, the testing equipment (208) will be able to measure a second level of corrosion on a soil side (210) of a bottom plate only while inserted.

The testing equipment (208) measures both the first level of corrosion on the product side (214) of the bottom plate and a second level of corrosion on the soil side (210) of the bottom plate to determine a bottom plate health when the storage tank apparatus is in service. The storage tank apparatus allows the bottom plate health to be determined without being drained, cleaned and degassed. The bottom plate health will aid in decisions regarding remaining lifespan and helps to prevent future unplanned shutdowns by identifying potential issues. The storage tank apparatus will experience no non-productive time during a tank inspection of the bottom plate.

The storage tank apparatus shown in FIGS. 1 and 2 is an apparatus with a single foundation channel with a single foundation tube (202) inserted inside the foundation channel, a single shell tube (212) attached to the product side (214) of the bottom plate, a single foundation inspection window (116) accessing the foundation tube (202), and a single shell inspection window (118) accessing the shell tube (212). Those skilled in the art will appreciate that the storage tank apparatus, in accordance with one or more embodiments, has at least one of the above components and may have several. The storage tank apparatus may include one of each component described above that spans the diameter of the bottom plate, as shown in FIG. 2C or many include several of the above components as long as they do not intersect one another, as shown in FIG. 2D. The shell tube(s) (212) and foundation tube(s) (202) should be offset from one another, so as to cover a greater area over the bottom plate and minimize coverage intersections. The number, location and length of components may be decided by a person of skill in the art, such as storage tank operator, based on the desired inspection coverage.

The storage tank apparatus described in FIGS. 1 and 2 may be the result of new production storage tanks, or the result of a modification of pre-existing storage tanks currently in the field. For example, a pre-existing storage tank may be modified to include the foundation channel, foundation tube and foundation inspection window, whenever there is a major repair to the pre-existing storage tank that provides access to the bottom plate support surface, such as a bottom plate replacement. The modifications including the shell inspection window and shell tube installment may be performed during a normal maintenance turnaround, when the tank is drained of the storage material.

Figure 3:
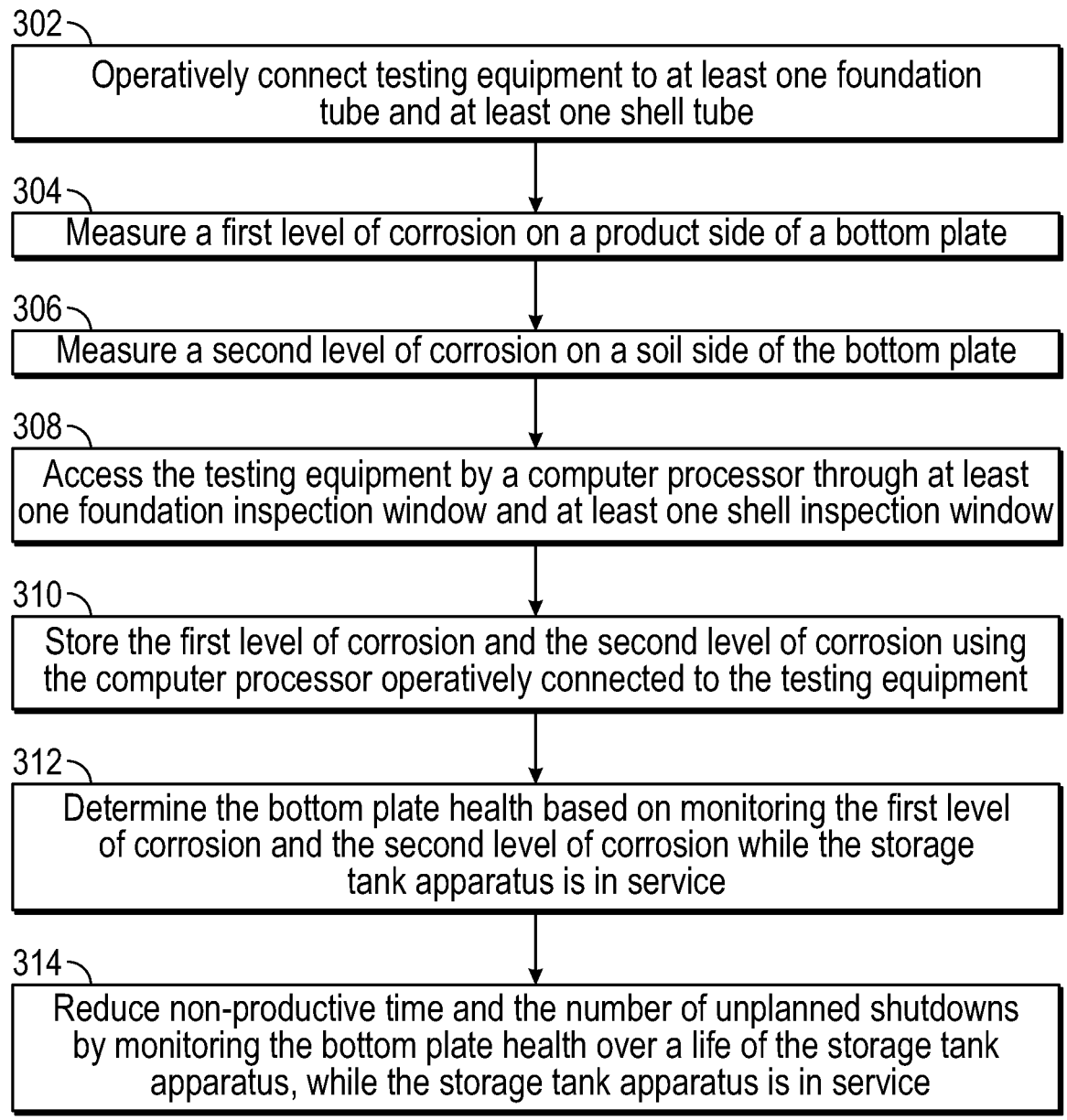
FIG. 3 shows a flowchart in accordance with one or more embodiments.

FIG. 3 shows a flowchart describing the method to determine a bottom plate health for a storage tank apparatus. The method is applicable to a storage tank apparatus as described in FIGS. 1 and 2A-2B. One or more blocks in FIG. 3 may be performed by one or more components (e.g., testing equipment 208) as described in FIGS. 1-2B. While the various blocks in FIG. 3 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

Initially, in Step 302, testing equipment is operatively connected to at least one foundation tube and at least one shell tube. For example, a thickness measurement probe, an online ultrasonic sensor, a magnetic flux leakage probe, or any other device or probe measuring corrosion may be directly or indirectly connected to one or both of the foundation tube(s) and shell tube(s). More specifically, in one or more embodiments, the testing equipment may be temporarily inserted or permanently fitted inside the foundation tube(s) and shell tube(s). If the testing equipment is not permanently disposed inside of the shell tube, then is the equipment may be inserted into the shell tube through the shell inspection window. Likewise, if the testing equipment is not permanently disposed inside of the foundation tube, then the equipment may be inserted into the foundation tube through the foundation inspection window.

In Step 304, in accordance with one or more embodiments, a first level of corrosion on a product side of a bottom plate is measured using the testing equipment operatively connected to the foundation tube(s). The testing equipment associated with the foundation tube faces the soil side of the bottom plate and may be configured to determine a first level of corrosion on the product side of the bottom plate. A single piece of testing equipment may be used, or a combination of multiple testing equipment may be used to obtain the measurement of the first level of corrosion. Measuring the first level of corrosion may include performing a series of measurements including obtaining actual thickness data, metal loss, corrosion rate and tank bottom plate defect detection.

In Step 306, in accordance with one or more embodiments, a second level of corrosion on a soil side of the bottom plate is measured using the testing equipment operatively connected to the shell tube(s). The testing equipment operatively connected to the shell tube faces the product side of the bottom plate and may determine a second level of corrosion on the soil side of the bottom plate. A single piece of testing equipment may be used, or a combination of multiple testing equipment may be used to obtain the measurement of the second level of corrosion. Measuring the first level of corrosion may include performing a series of measurements including obtaining actual thickness data, metal loss, corrosion rate and tank bottom plate defect detection. Although the method in FIG. 3 describes measuring a first level of corrosion and second level of corrosion in separate steps, those skilled in the art will readily appreciate that the first and second level of corrosion may be measured simultaneously, or in a different order than described in FIG. 3.

In Step 308, in accordance with one or more embodiments, the data/measurements captured by the testing equipment is accessed by a computer processor, through at least one foundation inspection window and at least one shell inspection window. The testing equipment may temporarily store the data before transmitting it to the computer processor or may immediately transfer the measurements to the computer processor, via wired or wireless connection. The testing equipment operatively connected to the foundation tube may be accessed by a computer processor through the foundation inspection window, and the testing equipment operatively connected to the shell tube maybe be accessed by a computer processor through the shell inspection window. For example, the data may be transferred via Internet of Things (IoT), Wifi, Bluetooth, or via a connected wire.

In one or more embodiments, the computer processor may be connected to and/or configured to read the first and second level of corrosion being measured by the testing equipment, while the storage tank is in service. If the testing equipment is permanently disposed within the shell tube and/or foundation tube, a continuous monitoring of the bottom plate health may be achieved, given that the computer processor has continuous access. Alternatively, periodic monitoring of the bottom plate health is performed by inserting the testing equipment into the respective tube(s) when measurements are required.

In Step 310, in accordance with one or more embodiments, the values of the first level of corrosion and the second level of corrosion are stored by the computer processor operatively connected to the testing equipment. The computer processor stores a series of measurements including actual thickness data, metal loss, corrosion rate and tank bottom plate defect detection. The computer processor may be a data logger in accordance with one of more embodiments. The stored series of measurements provides a tank operator valuable timestamped measurements to monitor the changing conditions of a bottom plate, while the storage tank apparatus is in service. A first and second level of corrosion may be determined frequently or continuously. The increased frequency of measurements helps a tank operator determine a corrosion rate and a tank remaining life more accurately.

In Step 312, in accordance with one or more embodiments, a bottom plate health is determined based on monitoring the first level of corrosion and the second level of corrosion while the storage tank apparatus is in service. The overall health of the bottom plate is determined by the health of both the soil side and the product side and includes metal thickness, metal loss, remaining life, and plate defect detection data. The bottom plate health incorporates measurements from the totality of testing equipment used and may aid in the turnaround planning processes, including determining any necessary repairs to extend the storage tank apparatus service life. Low thickness and severe corrosion alarms may be implemented based on the determination of the bottom plate health to prevent a storage tank leak.

In Step 314, in accordance with one or more embodiments, non-productive time and the number of unplanned shutdowns is reduced by monitoring the bottom plate health over a life of the storage tank apparatus, while the storage tank apparatus is in service. The ability to determine the bottom plate health while the storage tank apparatus is in service, reduces non-productive time. A non-productive time is any time experienced by the storage tank in which the primary function of the storage tank is stopped. Storage tanks typically need to be drained, cleaned, and degassed to provide access to the bottom plate for a manual inspection. This process puts a service tank out of service, until the tank inspection is completed which may take weeks. The storage tank apparatus alternatively, does not need to be taken out of service, in contrast and prevents non-productive time each and every time it is able to inspect the bottom plate while in service.

Due to the tedious process of manual inspections, which take the storage tank out of service, the manual inspection of the bottom plate is performed years apart and could miss the first signs of corrosion. A manual inspection may often detect a level of corrosion in the bottom plate that calls for major repairs, which is costly and could have been avoided with earlier detection using proactive measures including more frequent monitoring. Being able to monitor the bottom plate health over the life of the storage tank apparatus will improve quick detection, due to the ability to perform the inspections more frequently. Turnaround planning processes are improved by having more frequent measurements to forecast a tank apparatus service life. Early corrosion detection will reduce the need for more costly repairs after larger amounts of corrosive damage has been experienced. If the testing equipment is operatively connected to the shell tube and foundation tube, by being permanently disposed in the shell tube and foundation tube, a continuous monitoring of the bottom plate health may be performed, including incorporating low thickness and severe corrosion alarms to proactively reduce the number of storage tank apparatus leaks. By avoiding major repairs to the bottom plate health due to a continuous monitoring of the bottom plate health over a life of the storage tank apparatus, the storage tank apparatus also provides a method for cost-saving.

Figure 4:
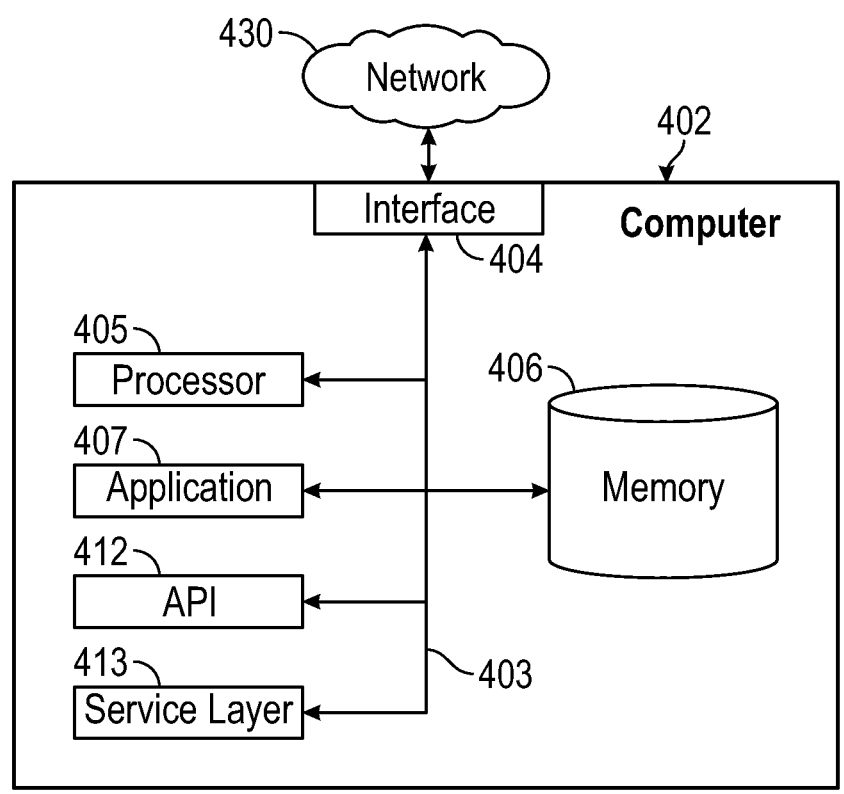
FIG. 4 shows a computing device in accordance with one or more embodiments.

FIG. 4 depicts a block diagram of a computer system (402) used to provide computational functionalities associated with described algorithms, methods, functions, processes, flows, and procedures as described in this disclosure, according to one or more embodiments. The illustrated computer (402) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (402) may include a computer that includes an input device, such as a keypad, keyboard, touch screen, or other device that may accept user information, and an output device that conveys information associated with the operation of the computer (402), including digital data, visual, or audio information (or a combination of information), or a GUI.

The computer (402) may serve in a role as a client, network component, a server, a database or other persistency, or any other component (or a combination of roles) of a computer system for performing the subject matter described in the instant disclosure. The illustrated computer (402) is communicably coupled with a network (430). In some implementations, one or more components of the computer (402) may be configured to operate within environments, including cloud-computing-based, local, global, or other environment (or a combination of environments).

At a high level, the computer (402) is an electronic computing device operable to receive, transmit, process, store, or manage data and information associated with the described subject matter. According to some implementations, the computer (402) may also include or be communicably coupled with an application server, e-mail server, web server, caching server, streaming data server, business intelligence (BI) server, or other server (or a combination of servers).

The computer (402) may receive requests over network (430) from a client application (for example, executing on another computer (402)) and responding to the received requests by processing the said requests in an appropriate software application. In addition, requests may also be sent to the computer (402) from internal users (for example, from a command console or by other appropriate access method), external or third-parties, other automated applications, as well as any other appropriate entities, individuals, systems, or computers.

Each of the components of the computer (402) may communicate using a system bus (403). In some implementations, any or all of the components of the computer (402), both hardware or software (or a combination of hardware and software), may interface with each other or the interface (404) (or a combination of both) over the system bus (403) using an application programming interface (API) (412) or a service layer (413) (or a combination of the API (412) and service layer (413). The API (412) may include specifications for routines, data structures, and object classes. The API (412) may be either computer-language independent or dependent and refer to a complete interface, a single function, or even a set of APIs. The service layer (413) provides software services to the computer (402) or other components (whether or not illustrated) that are communicably coupled to the computer (402).

The functionality of the computer (402) may be accessible for all service consumers using this service layer. Software services, such as those provided by the service layer (413), provide reusable, defined business functionalities through a defined interface. For example, the interface may be software written in JAVA, C++, or other suitable language providing data in extensible markup language (XML) format or another suitable format. While illustrated as an integrated component of the computer (402), alternative implementations may illustrate the API (412) or the service layer (413) as stand-alone components in relation to other components of the computer (402) or other components (whether or not illustrated) that are communicably coupled to the computer (402). Moreover, any or all parts of the API (412) or the service layer (413) may be implemented as child or sub-modules of another software module, enterprise application, or hardware module without departing from the scope of this disclosure.

The computer (402) includes an interface (404). Although illustrated as a single interface (404) in FIG. 6, two or more interfaces (404) may be used according to particular needs, desires, or particular implementations of the computer (402). The interface (404) is used by the computer (402) for communicating with other systems in a distributed environment that are connected to the network (430). Generally, the interface (404 includes logic encoded in software or hardware (or a combination of software and hardware) and operable to communicate with the network (430). More specifically, the interface (404) may include software supporting one or more communication protocols associated with communications such that the network (430) or interface's hardware is operable to communicate physical signals within and outside of the illustrated computer (402).

The computer (402) includes at least one computer processor (405). Although illustrated as a single computer processor (405) in FIG. 6, two or more processors may be used according to particular needs, desires, or particular implementations of the computer (402). Generally, the computer processor (405) executes instructions and manipulates data to perform the operations of the computer (402) and any algorithms, methods, functions, processes, flows, and procedures as described in the instant disclosure.

The computer (402) also includes a non-transitory computer (402) readable medium, or a memory (406), that holds data for the computer (402) or other components (or a combination of both) that may be connected to the network (430). For example, memory (406) may be a database storing data consistent with this disclosure. Although illustrated as a single memory (406) in FIG. 6, two or more memories may be used according to particular needs, desires, or particular implementations of the computer (402) and the described functionality. While memory (406) is illustrated as an integral component of the computer (402), in alternative implementations, memory (406) may be external to the computer (402).

The application (407) is an algorithmic software engine providing functionality according to particular needs, desires, or particular implementations of the computer (402), particularly with respect to functionality described in this disclosure. For example, application (407) may serve as one or more components, modules, applications, etc. Further, although illustrated as a single application (407), the application (407) may be implemented as multiple applications (407) on the computer (402). In addition, although illustrated as integral to the computer (402), in alternative implementations, the application (407) may be external to the computer (402).

There may be any number of computers (402) associated with, or external to, a computer system containing computer (402), wherein each computer (402) communicates over network (430). Further, the term "client," "user," and other appropriate terminology may be used interchangeably as appropriate without departing from the scope of this disclosure. Moreover, this disclosure contemplates that many users may use one computer (402), or that one user may use multiple computers (402).

Although only a few example embodiments have been described in detail above, those skilled in the art will readily appreciate that many modifications are possible, including dimensions, in the example embodiments without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112(f) for any limitations of any of the claims herein, except for those in which the claim expressly uses the words "means for" or "step for" together with an associated function.

What is claimed is:

1. A storage tank apparatus comprising:
a tank foundation having a bottom plate support surface and at least one foundation channel;
at least one foundation tube that is housed inside the at least one foundation channel;
a bottom plate having a product side and a soil side, wherein the soil side contacts the bottom plate support surface and the product side contacts a storage material;
a tank shell connected to an outer perimeter of the bottom plate, wherein the bottom plate provides a bottom structural support for the storage material stored within the tank shell;
at least one shell tube connected to the product side of the bottom plate;
at least one foundation inspection window that provides access to the at least one foundation tube;
at least one shell inspection window that provides access to the at least one shell tube; and
testing equipment that is operatively connected to the at least one foundation tube and the at least one shell tube,
wherein the testing equipment measures a first level of corrosion on the product side of the bottom plate and a second level of corrosion on the soil side of the bottom plate to determine a bottom plate health when the storage tank apparatus is in service.

2. The storage tank apparatus of claim 1, wherein the bottom plate support surface comprises a reinforced concrete perimeter and a compacted fill portion.

3. The storage tank apparatus of claim 2, wherein the at least one foundation inspection window comprises at least one foundation opening in a side of the reinforced concrete perimeter that provides access to the at least one foundation tube.

4. The storage tank apparatus of claim 1, wherein the at least one foundation channel is a semi-circular opening that extends across a diameter of the bottom plate support surface.

5. The storage tank apparatus of claim 1, wherein the at least one foundation tube comprises a first open side facing the soil side of the bottom plate and a first semi-circular side inserted into the at least one foundation channel.

6. The storage tank apparatus of claim 1, wherein the at least one shell tube comprises a second open side facing the product side of the bottom plate, a second semi-circular side that contacts the storage material and a shell endpoint surface that is attached to the product side of the bottom plate.

7. The storage tank apparatus of claim 6, wherein the at least one shell tube does not intersect a floating roof leg that is disposed on the product side of the bottom plate.

8. The storage tank apparatus of claim 1, wherein the testing equipment includes a thickness measurement probe, an online ultrasonic sensor and a magnetic flux leakage probe.

9. The storage tank apparatus of claim 1, wherein operatively connected includes being permanently disposed inside of and inserted into periodically.

10. The storage tank apparatus of claim 1, wherein the at least one shell inspection window comprises at least one shell opening disposed in a side of the tank shell that provides access to the at least one shell tube.

11. A method for determining a bottom plate health for a storage tank apparatus, the method comprising:
operatively connecting testing equipment to both of at least one foundation tube and at least one shell tube;
measuring, using the testing equipment operatively connected to the at least one foundation tube, a first level of corrosion on a product side of a bottom plate;
measuring, using the testing equipment operatively connected to the at least one shell tube, a second level of corrosion on a soil side of the bottom plate, wherein the product side of the bottom plate contacts a storage material stored in the storage tank apparatus and the at least one shell tube;
accessing, by a computer processor and through at least one foundation inspection window of a storage tank foundation and at least one shell inspection window of a tank shell, the testing equipment;
storing, using the computer processor operatively connected to the testing equipment, the first level of corrosion and the second level of corrosion; and
determining, using the computer processor, the bottom plate health based at least in part on monitoring the first level of corrosion and the second level of corrosion while the storage tank apparatus is in service.

12. The method of claim 11, further comprising:
reducing a non-productive time by determining the bottom plate health while the storage tank apparatus is in service; and
reducing a number of unplanned shutdowns by monitoring the bottom plate health over a life of the storage tank apparatus.

13. The method of claim 11, wherein operatively connecting includes permanently disposing inside of and inserting into periodically.

14. The method of claim 11, wherein the testing equipment includes a thickness measurement probe, an online ultrasonic sensor and a magnetic flux leakage probe.

15. The method of claim 11, wherein the bottom plate provides a bottom structural support for the storage material stored within the tank shell connected to an outer perimeter of the bottom plate.

16. The method of claim 11, wherein the at least one foundation inspection window comprises at least one foundation opening in a side of a reinforced concrete perimeter and the at least one shell inspection window comprises of at least one shell opening in a tank shell.

17. The method of claim 11, wherein the at least one foundation tube is housed inside at least one foundation channel that extends across a diameter of a bottom plate support surface.

18. The method of claim 17, wherein the bottom plate support surface comprises a reinforced concrete perimeter and a compacted fill portion.

19. The method of claim 11, wherein the first level of corrosion and the second level of corrosion includes a series of measurements including actual thickness data, metal loss, corrosion rate and tank bottom plate defect detection.

20. The method of claim 11, wherein the at least one foundation tube comprises a first open side facing the soil side of the bottom plate and a first semi-circular side making contact with a foundation channel and the at least one shell tube comprises a second open side facing the product side of the bottom plate, a second semi-circular side making contact with the storage material and a shell endpoint surface that is attached to the product side of the bottom plate.

* * * * *